United States Patent [19]

Miyazaki et al.

[11] Patent Number: 4,808,902
[45] Date of Patent: Feb. 28, 1989

[54] CONTROL APPARATUS FOR BRUSH-LESS MOTOR

[75] Inventors: Masanori Miyazaki, Tokorozawa; Akihiko Kuroiwa, Tokyo, both of Japan

[73] Assignee: Kabushiki Kaisha Toshiba, Kawasaki, Japan

[21] Appl. No.: 197,327

[22] Filed: May 23, 1988

[30] Foreign Application Priority Data

May 26, 1987 [JP] Japan .................. 62-127110

[51] Int. Cl.$^4$ ............................................. H02P 5/40
[52] U.S. Cl. ................................... 318/798; 318/806; 318/723
[58] Field of Search ........... 318/798, 806, 722, 723, 318/729; 361/23, 33

[56] References Cited

U.S. PATENT DOCUMENTS

| | | | |
|---|---|---|---|
| 4,255,693 | 3/1981 | Keidl .................... | 318/721 |
| 4,275,343 | 6/1981 | Fulton et al. .......... | 318/721 |
| 4,409,533 | 10/1983 | Kawbata ............... | 318/807 |
| 4,427,934 | 1/1984 | Tupper .................. | 318/798 |
| 4,469,998 | 9/1984 | Nola ..................... | 318/729 |

Primary Examiner—David Smith, Jr.
Attorney, Agent, or Firm—Oblon, Fisher, Spivak, McClelland & Maier

[57] ABSTRACT

Disclosed is a control apparatus for a brush-less motor, which can prevent commutation failure of an inverter for driving the motor. The control apparatus, according to the invention detects a counter EMF of the motor, and the detected counter EMF is applied to a PLL circuit. In the course of normal operation of the motor, an output of the PLL circuit is used for controlling the advanced control angle of a motor drive inverter. Any abnormality in the condition of the motor, such as that arising from an abrupt change in load of the motor, causes a sudden and substantial variation in the magnitude and phase of the counter EMF. Since the internal condition of the PLL circuit changes in response to this counter EMF variation, a signal generated by the PLL circuit is therefore used to detect the counter EMF variation. This internal signal is compared with a predetermined limit level, and when its signal level is found to exceed this limit level, operation of the motor drive inverter is stopped, whereby commutation failure of the inverter is prevented.

15 Claims, 7 Drawing Sheets

CONTROL APPARATUS FOR BRUSH-LESS MOTOR

BACKGROUND OF THE INVENTION

1. Field of the Invention

The present invention relates to the improvement of a control apparatus for a brush-less motor.

2. Description of the Related Art

A brush-less motor is a commonly known as rotation speed-controllable synchronous motor (which is often abbreviated to SM). In such a synchronous motor, the position of the rotor thereof must be detected in order to achieve phase control of the armature current. Under such phase control, the synchronous motor can operate with a prescribed advance control angle.

Conventionally, a mechanical position sensor (which is often abbreviated to simply PS) is coupled to the end of a rotor shaft of the motor so as to detect the rotor position, thereby achieving the phase control. Often, an electronic position sensor (often abbreviated to EPS) is used instead, which detects a counterelectromotive force of the motor to achieve phase control of the armature current.

According to a conventional brush-less motor employing an electronic position sensor, any sudden change in the load of the motor results in the phase of the counterelectromotive force of the motor varying abruptly in response thereto. When such an abrupt phase variation occurs, the advanced control angle of power conversion elements, which constitute an inverter for driving the motor, cannot be controlled precisely. As a result, the commutation margin angle of the power conversion elements decreases unduly, with the likelihood that commutation of the power conversion elements will fail. The same problem (commutation failure) will occur if the magnetic field strength of a synchronous motor or the armature current thereof varies abruptly.

SUMMARY OF THE INVENTION

It is accordingly an object of the present invention to provide a control apparatus for a brush-less motor, which apparatus can prevent commutation failure of an inverter for driving the motor.

To achieve the above object, a control apparatus according to the invention detects the counterelectromotive force (counter EMF) of the brush-less motor, and the detected counter EMF is applied to a phase-locked loop (PLL) circuit. In the course of normal operation of the motor, an output of the PLL circuit is used for controlling the advanced control angle ($\beta$) of a motor drive inverter. Any abnormality in the condition of the motor, arising, for example, as a result of an abrupt change in the load of the motor, causes a sudden and substantial variation in the magnitude and phase of the counter EMF. Since the internal condition of the PLL circuit changes in response to this counter EMF variation, a signal generated by the PLL circuit (for example, an output signal delivered from a phase difference detector in the PLL circuit) can be used to detect the counter EMF variation. This output signal is compared with a predetermined limit level, and when its signal level is found to exceed this limit, operation of the motor drive inverter is stopped or modified, whereby commutation failure of the inverter is prevented.

DETAILED DESCRIPTION OF THE PREFERRED EMBODIMENTS

In the following, preferred embodiments of the present invention will be described with reference to the accompanying drawings.

Figure 1:
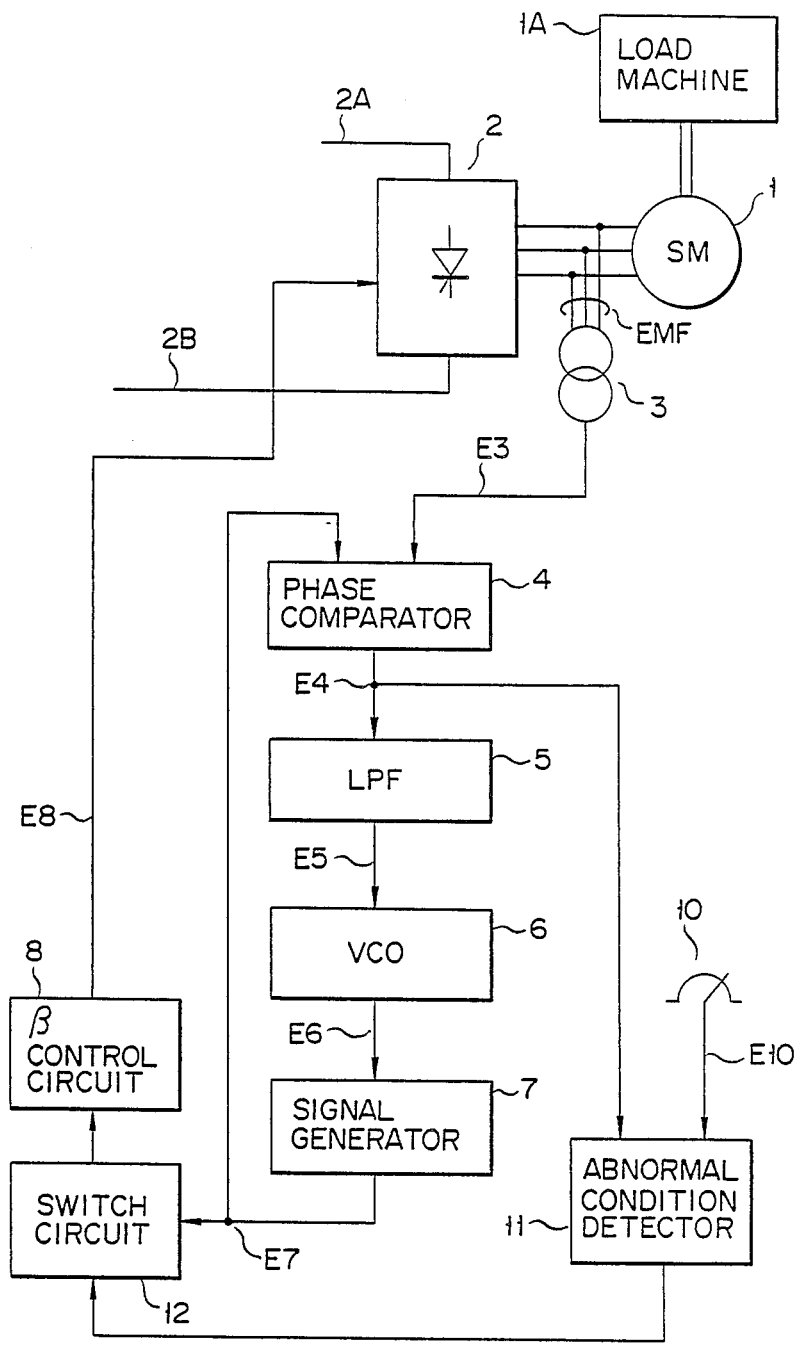
FIG. 1 shows a block diagram of a control apparatus for a brush-less motor according to an embodiment of this invention.

FIG. 1 shows a block diagram of a control apparatus for a brush-less motor according to a first embodiment of this invention. As is shown, the control target, i.e., synchronous motor (SM) 1, is driven by inverter 2. Inverter 2 is energized with DC power obtained from a rectifier (not shown), via DC lines 2A and 2B.

When SM 1 operates to rotate load machine 1A, it generates counterelectromotive force EMF in response to the rotation thereof. Counterelectromotive force EMF is converted into signal E3, via electrically-insulated type potential transformer 3, and is input to phase comparator 4. In comparator 4, the signal phase of E3 is compared with that of AC feedback signal E7, and signal E4, representing the phase difference between E3 and E7, is output therefrom. Signal E4, once its higher harmonic components have been filtered off, via low-pass filter (LPF) 5, is converted into signal E5.

Signal E5 controls voltage-controlled oscillator (VCO) 6, such that the frequency of output E6 from VCO 6 varies in response to the signal level of E5. Output E6 (non-sinewave) from VCO 6 is converted into AC feedback signal E7 (sinewave), via signal generator 7.

Signal E7 is sent, via switch circuit 12, to $\beta$ control circuit 8. Output pulses E8 from circuit 8 are supplied to switching elements (not shown) which constitute inverter 2. The firing or triggering of these switching elements is controlled, with given advanced control angle $\beta$, according to pulses E8.

Circuit elements 4–7 constitute a so-called PLL circuit. This PLL circuit controls 8 control circuit 8 such that the phase difference between signals EMF and E7 becomes substantially zero.

Signal E4 from comparator 4 in the PLL circuit is supplied to abnormal condition detector 11. Detector 11 compares the signal level (or voltage potential) of E4 with given limit level E10. Level E10 can be optionally determined by limit level setter 10.

When SM 1 operates normally, signal E4 has a level lower than limit level E10. In this case, detector 11 sends no signal to switch circuit 12.

When the magnitude of load 1A suddenly changes, the phase of counterelectromotive source EMF of SM 1 correspondingly changes abruptly. Such a change of EMF causes variation in signal E4. With this variation, if the signal level of E4 reaches or exceeds limit level E10, detector 11 sends signal E11 to switch circuit 12. When circuit 12 receives signal E11, it interrupts the sending of signal E7 from generator 7 to $\beta$ control circuit 8, thereby suspending or stopping the operation of inverter 2.

Although not shown in FIG. 1, at the time SM 1 is started, $\beta$ control circuit 8 responds to an output of a position sensor coupled to the rotor shaft of SM 1. After the rotational speed of SM 1 has reached a given rated value, then the input of circuit 8 is switched to respond to signal E7 from the PLL circuit.

Incidentally, abnormal condition detector 11 can be made of a conventional comparator for comparing the signal level of E4 with limit level E10. Further, switch circuit 12 can be made of an electrical analog switch controlled by signal E11. A junction type FET having a source-drain path inserted between circuits 7 and 8, and having a gate which receives signal E11, may be used for the electrical analog switch (12).

Figure 2:
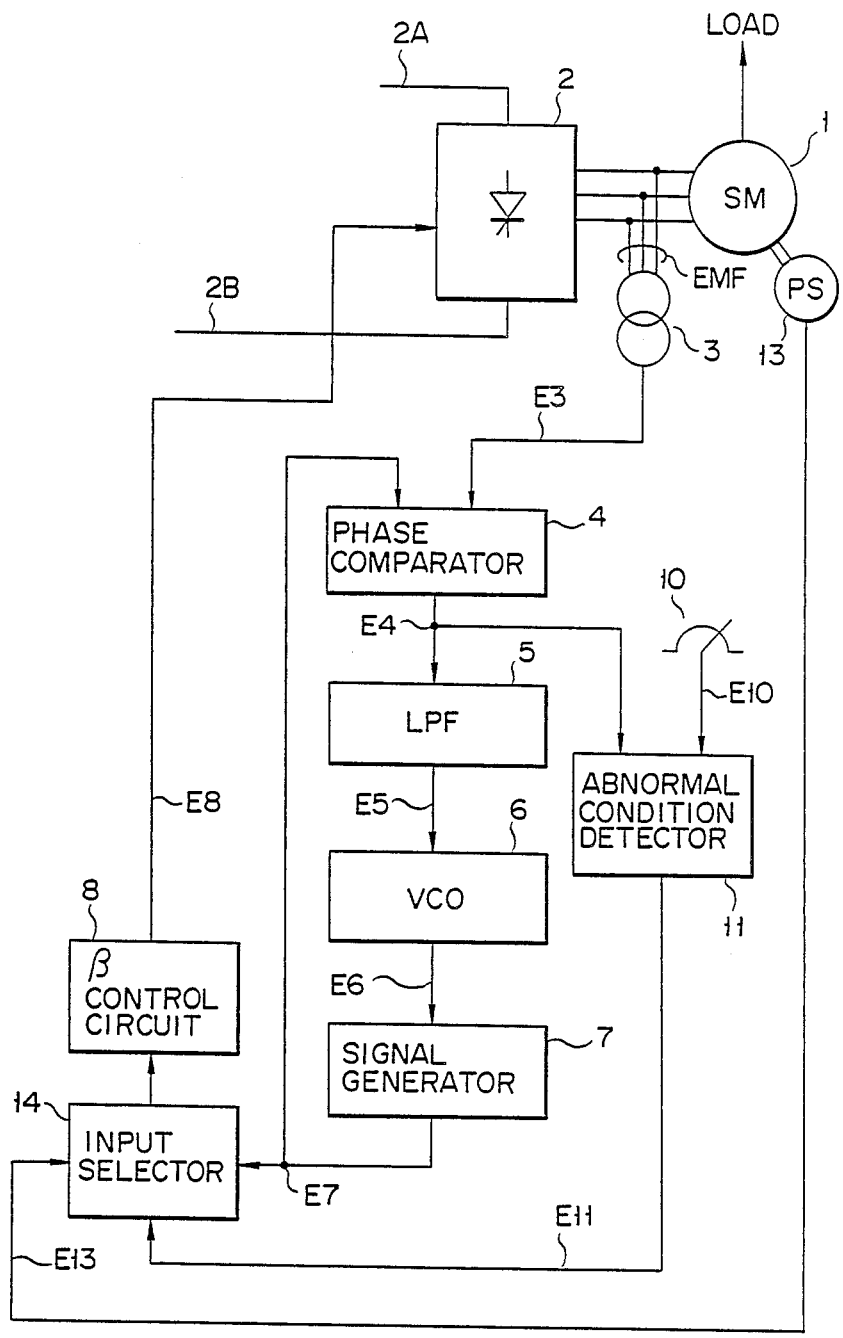
FIG. 2 shows a block diagram of a control apparatus for a brush-less motor according to another embodiment of this invention.

FIG. 2 shows a block diagram of a control apparatus for a brush-less motor according to a second embodiment of this invention.

The embodiment of FIG. 2 differs from the embodiment of FIG. 1, in that input selector 14 for selecting signal E7 or E13 is inserted between circuits 7 and 8. Signal E13 is output from position sensor (PS) 13 coupled to the rotor shaft of SM 1.

When SM 1 operates normally, no signal is generated from abnormal condition detector 11, and signal E7 is selected by selector 14.

When SM 1 is subjected to a large and sudden load variation and signal E11 is generated from detector 11, signal E13 is selected by selector 14, and SM 1 is operated based on signal E13. In this case, the value of advanced control angle $\beta$ may be increased, the magnitude of the load may be decreased, and/or the rotational speed of SM 1 may be slowed down.

However, if a situation does not allow to continue the operation of SM 1, then, in response to signal E11, selector 14 interrupts the supply of signal E7 or E13 to circuit 8 so that inverter 2 stops. In this case, selector 14 can be made of an electrical analog switch or a relay circuit having a function of selecting E7, E13, or none.

The criterion of the selection of signal E7, signal E13, or no signal, generally depends on the property of the load of SM 1, and it can be prefixed. Which signal (E7, E13 or no signal) is to be selected can be determined in accordance with the magnitude of the phase difference signal E4 from phase comparator 4.

Figure 3:
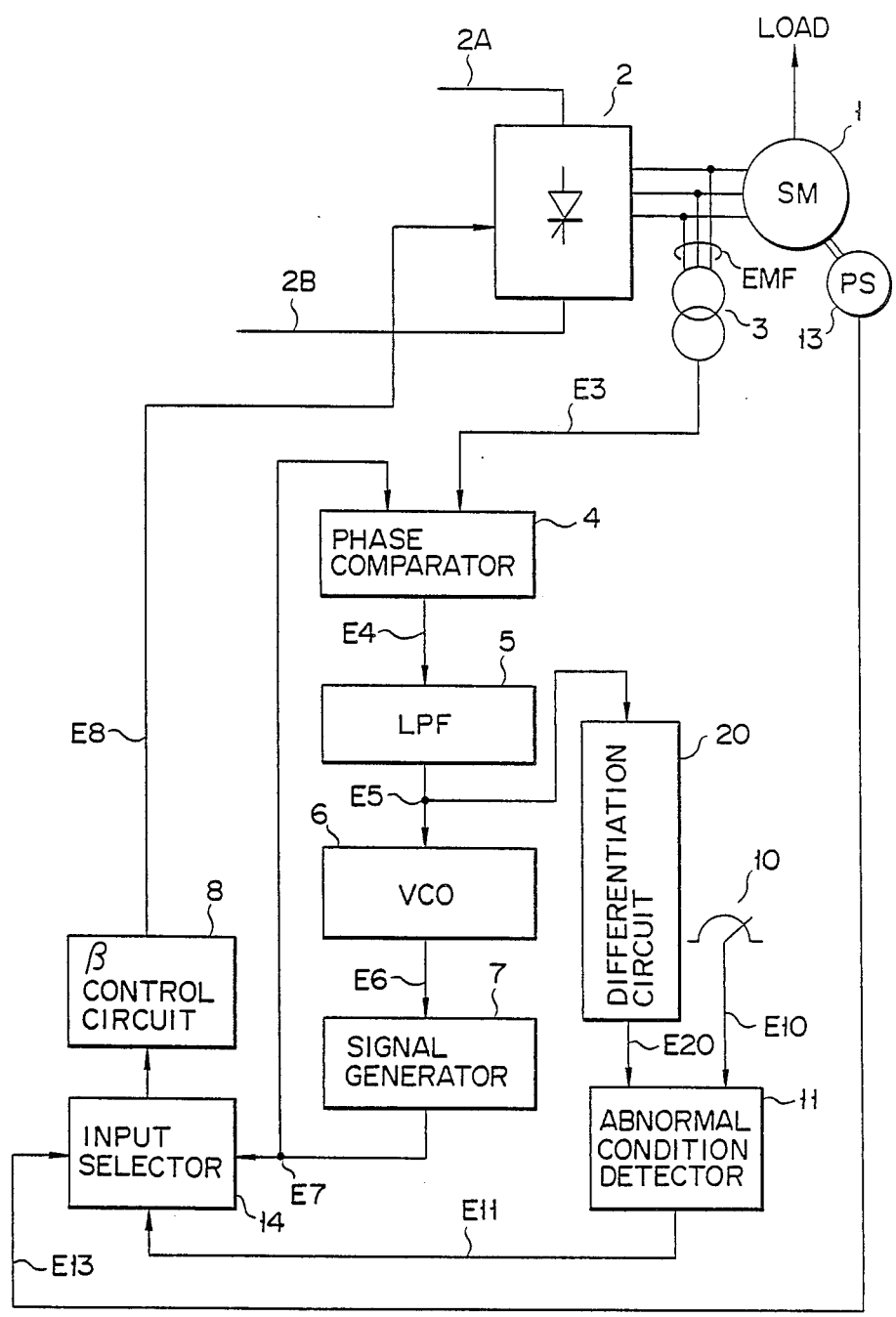
FIG. 3 shows a block diagram of a control apparatus for a brush-less motor according to still another embodiment of this invention.

FIG. 3 shows a block diagram of a control apparatus for a brush-less motor according to a third embodiment of this invention.

The embodiment of FIG. 3 differs from the embodiment of FIG. 2, in that output signal E5 from LPF 5 is differentiated with respect to time by differentiation circuit 20, and differentiated output E20 from circuit 20 is compared with limit level E10 at abnormal condition detector 11. In other words, signal E5 is used, in place of signal E4, for detecting an abnormal condition of SM 1.

Assume that the phase difference between signals EMF and E7 is represented by $\Delta\phi$. Then, signal E4 or E5 corresponds to phase difference $\Delta\phi$, and differentiated output E20 indicates a rate of change ($\partial\Delta\phi/\partial t$) of phase difference $\Delta\phi$.

When the load of SM 1 changes suddenly, the rate of change ($\partial\Delta\phi/\partial t$) of $\Delta\phi$, or the signal level of E20, prominently increases. If the signal level of E20 reaches or exceeds limit level E10, signal E11 is supplied to input selector 14, and $\beta$ control circuit 8 operates in response to signal E13 from PS 13.

Figure 4:
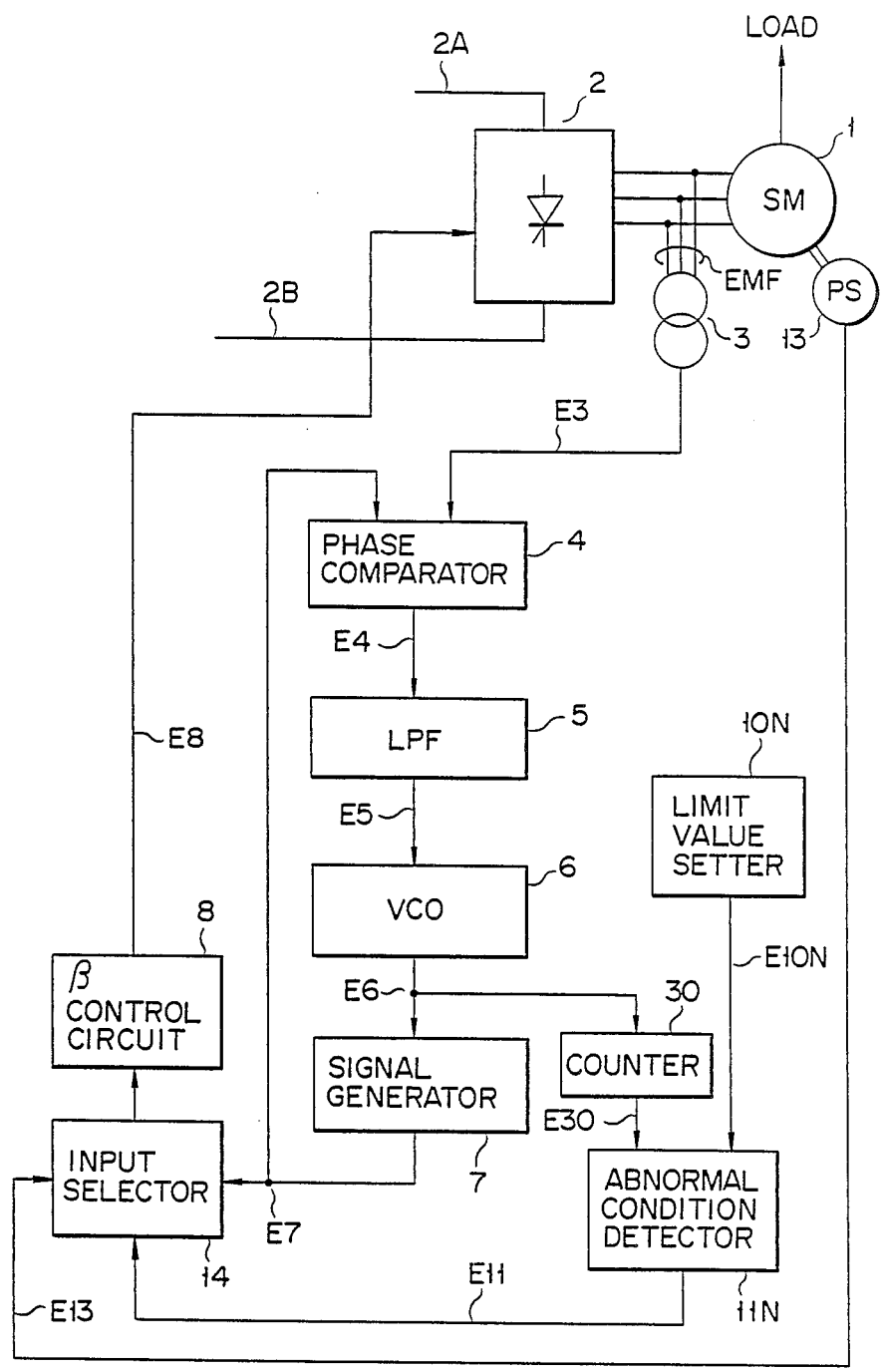
FIG. 4 shows a block diagram of a control apparatus for a brush-less motor according to yet another embodiment of this invention.

FIG. 4 shows a block diagram of a control apparatus for a brush-less motor according to a fourth embodiment of this invention.

The embodiment of FIG. 4 differs from the embodiment of FIG. 3, in that the number of pulses of signal E6 from VCO 6 is counted by counter 30, and the count value E30 from circuit 30 is compared with limit value E10N at abnormal condition detector (digital comparator) 11N. Limit value E10N (digital data) is variable and delivered from limit value setter 10N In this embodiment, signal E6 is used, in place of signal E5, for detecting an abnormal condition of SM 1.

When the load of SM 1 changes suddenly, the frequency of signal E6, or the number of pulses of E6 generated within a fixed time period, increases correspondingly, to thereby increase count value E30. If count value E30 reaches or exceeds limit value E10N, signal E11 is supplied to input selector 14, and $\beta$ control circuit 8 operates in accordance with signal E13 from PS 13.

Figure 5:
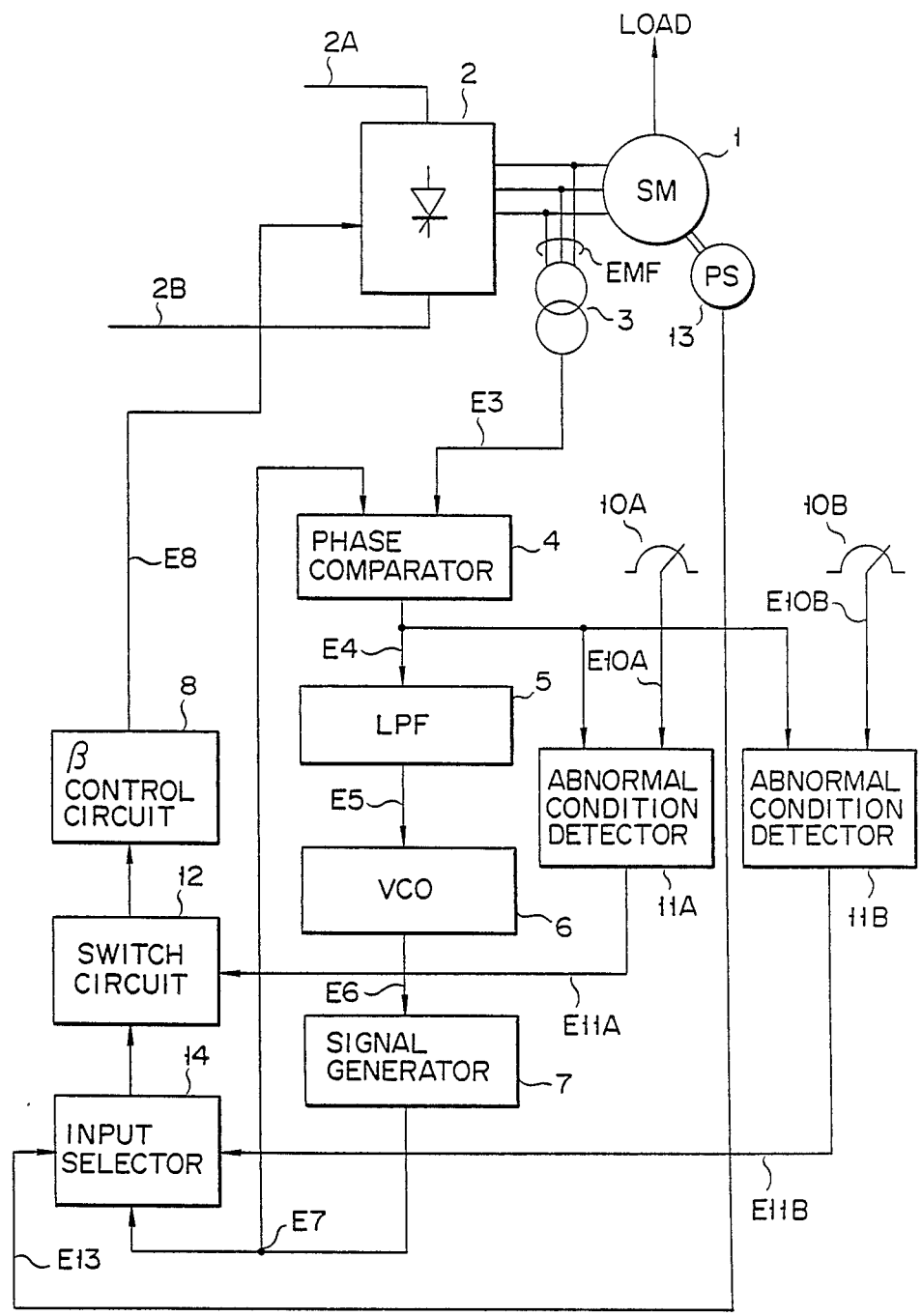
FIG. 5 shows a block diagram of a control apparatus for a brush-less motor according to a further embodiment of this invention.

FIG. 5 shows a block diagram of a control apparatus for a brush-less motor according to a fifth embodiment of this invention.

The embodiment of FIG. 5 is obtained by combining the embodiments of FIG. 1 and FIG. 2. More specifically, first abnormal condition detector 11A for controlling switch circuit 12 corresponds to detector 11 in FIG. 1, and second abnormal condition detector 11B corresponds to detector 11 in FIG. 2. Detector 11A receives first limit level E10A, and detector 11B receives second limit level E10B. Although the level of each of E10A and E10B can be optionally determined, E10A is set higher than E10B in this embodiment.

The embodiment of FIG. 5 will operate as follows.

When SM 1 operates normally, the phase difference between signals E3 (or EMF) and E7 is very small (almost zero), and a relation E10A > E10B > E4 is established. In this case, signal E7 is sent to $\beta$ control circuit 8, via input selector 14 and switch circuit 12.

When SM 1 is subjected to a sudden increase of load, signal E4 from phase comparator 4 correspondingly increases. If, in this case a relation E10A > E4 > E10B holds, then detector 11B generates signal E11B so that signal E13 from PS 13 is selected by selector 14, and selected signal E13 is supplied to $\beta$ control circuit 8. In this case, the operation of SM 1 is continued to be based on the output from PS 13.

When SM 1 is subjected to a sudden and large increase of load, signal E4 from phase comparator 4 prominently increases. If, in this case a relation E4 > E10A > E10B holds, then detector 11A generates signal E11A so that signal E13 selected by selector 14 is prevented from being supplied to $\beta$ control circuit 8. In this case, the operation of SM 1 stops.

Figure 6:
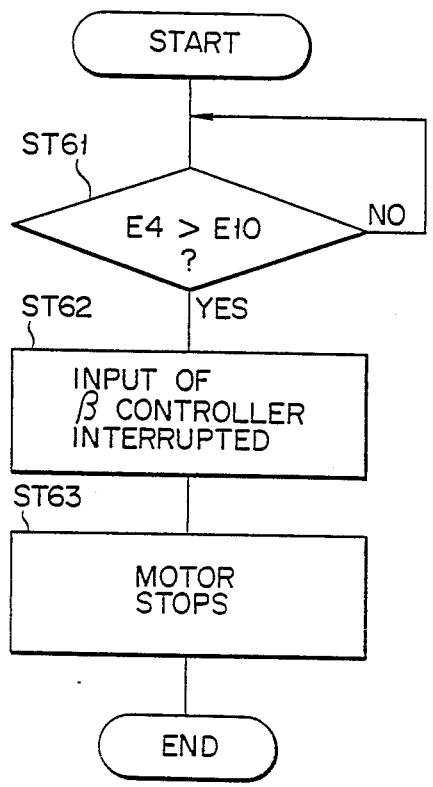
FIG. 6 is a flow chart explaining the operation of the embodiment shown in FIG. 1.

FIG. 6 is a flow chart for explaining the operation of the embodiment shown in FIG. 1, when this embodiment is controlled by a microcomputer (MPU). In this explanation, limit level E10 is preset at a level corresponding to an advanced control angle ($\beta$) of 5 degrees.

When SM 1 normally operates, the MPU (not shown) controls the circuit elements 2-8 in FIG. 1, so that the phase difference between E3 and E7 becomes minimum (or zero). When the MPU detects that the phase difference (E4) reaches or exceeds 5 degrees (yes at step ST61), the MPU causes detector 11 to generate signal E11, so that switch circuit 12 interrupts the signal connection between generator 7 and $\beta$ control circuit 8 (step ST62). Then, circuit 8 ceases the generation of pulses E8, and inverter 2 stops the operation of SM 1 (step ST63).

Figure 7:
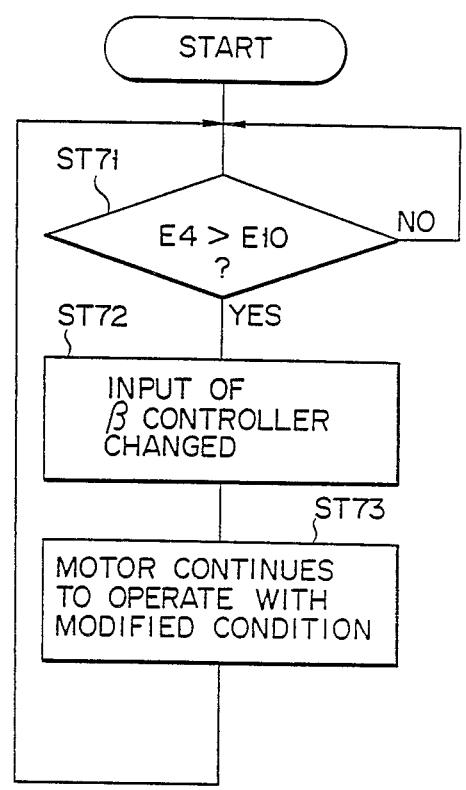
FIG. 7 is a flow chart explaining the operation of the embodiment shown in FIG. 2.

FIG. 7 is a flow chart for explaining the operation of the embodiment shown in FIG. 2, when this embodiment is controlled by an MPU. In this explanation, limit level E10 is preset at a level corresponding to an advanced control angle ($\beta$) of 5 degrees.

When SM 1 normally operates, the MPU (not shown) controls the circuit elements 2-8 in FIG. 2 so that the phase difference between E3 and E7 becomes minimum (or zero). When the MPU detects that the phase difference (E4) reaches or exceeds 5 degrees (yes at step ST71), the MPU causes detector 11 to generate signal E11, so that input selector 14 selects signal E13 in place of signal E7, to thereby supply the selected signal (E13) to $\beta$ control circuit 8. Then, circuit 8 changes or modifies the mode of generation of pulses E8 (step ST72), and inverter 2 drives SM 1 with the modified condition (step ST73).

Figure 8:
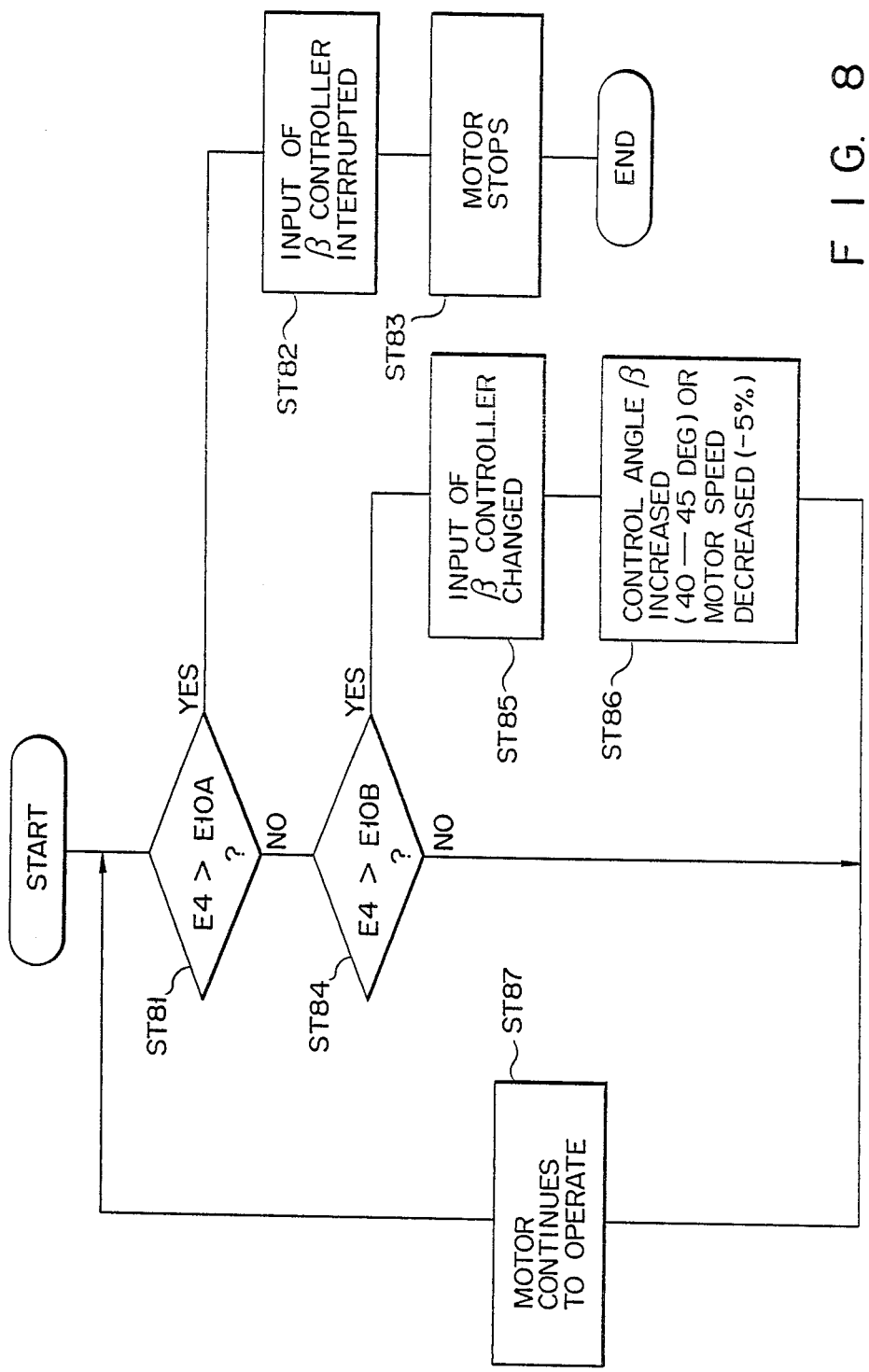
FIG. 8 is a flow chart explaining the operation of the embodiment shown in FIG. 5.

FIG. 8 is a flow chart for explaining the operation of the embodiment shown in FIG. 5, when this embodiment is controlled by an MPU. In this explanation, limit level E10A is preset at a level corresponding to an advanced control angle ($\beta$) of 5 degrees, and limit level E10B is preset at a level corresponding to the advanced control angle ($\beta$) of 3 degrees.

In a normal condition (no at steps ST81 and ST84), the MPU controls the circuit elements 2-8 in FIG. 5 so that the phase difference between E3 and E7 becomes zero, and SM 1 normally operates (step ST87).

When the MPU detects that the phase difference (E4) reaches or exceeds 5 degrees (yes at step ST81), the MPU causes detector 11A to generate signal E11A, so that switch circuit 12 interrupts the signal connection between generator 7 and 8 control circuit 8. Then, circuit 8 ceases the generation of pulses E8 (step ST82), and inverter 2 stops the operation of SM 1 (step ST83).

When the MPU detects that the phase difference (E4) is less than 5 degrees (no at step ST81) but it is larger than 3 degrees (yes at step ST84), the MPU causes detector 11B to generate signal E11B, so that input selector 14 selects signal E13 in place of signal E7 (step ST85), to thereby supply the selected signal (E13) to 8 control circuit 8. Then, circuit 8 increases the value of advanced control angle $\beta$ (for example, from 40 degrees to 45 degrees), or decreases the rotational speed of SM 1 (for example, 5% off of the current speed) (step ST86), and inverter 2 drives SM 1 with such a modified control angle ($\beta$=45 degrees) or with decreased speed (95% of the current speed).

While the invention has been described in connection with what is presently considered to be the most practical and preferred embodiment, it is to be understood that the invention is not limited to the disclosed embodiment but, on the contrary, is intended to cover various modifications and equivalent arrangements included within the scope of the appended claims, which scope is to be accorded the broadest interpretation so as to encompass all such modifications and equivalent arrangements.

What is claimed is:

1. A control apparatus for a brush-less motor, comprising:

inverter means for energizing the brush-less motor;

$\beta$ control means for controlling an operation of said inverter means, in accordance with an internal control signal;

detector means for detecting a counterelectromotive force generated by said brush-less motor, and providing an EMF signal representing said counter-electromotive force;

PLL means for comparing a phase of said EMF signal with that of said internal control signal, and controlling said $\beta$ control means by said internal control signal, such that a phase difference between said internal control signal and said EMF signal becomes minimal; and check means, coupled to said PLL means and said $\beta$ control means, for checking an amount of the phase difference between said internal control signal and said EMF signal, and when a checked amount of the phase difference is found to have reached or exceeded a predetermined amount, modifying the operation of said $\beta$ control means so that a commutation failure of said inverter means is prevented.

2. A control apparatus according to claim 1, wherein said check means includes:

comparator means, responsive to a given limit level and said checked amount, for comparing a signal level of said checked amount with said limit level, and when said checked amount is found to have reached or exceeded said limit level, generating a condition control signal; and switch means, located between said PLL means and said $\beta$ control means and coupled to said comparator means, for interrupting a supply of said internal control signal from said PLL means to said $\beta$ control means when said condition control signal is generated.

3. A control apparatus according to claim 1, wherein said check means includes:

comparator means, responsive to a given limit level and said checked amount, for comparing a signal level of said checked amount with said limit level, and when said checked amount is found to have reached or exceeded said limit level, generating a condition control signal; and sensor means, coupled to said brush-less motor, for detecting a rotor position thereof, to provide a position signal;

selector means, located between said PLL means and said $\beta$ control means and coupled to said comparator means and said sensor means, for selecting either of said internal control signal and said position signal, such that when no signal is generated by said comparator means, said internal control signal is supplied to said $\beta$ control means, and when said condition control signal is generated, said position signal is supplied to said $\beta$ control means.

4. A control apparatus according to claim 1, wherein said check means includes:

first comparator means, responsive to a given first limit level and said checked amount, for comparing a signal level of said checked amount with said first limit level, and when said checked amount is found to have reached or exceeded said first limit level, generating a first condition control signal;

switch means, located between said PLL means and said β control means and coupled to said first comparator means, for interrupting a supply of said internal control signal from said PLL means to said β control means when said first condition control signal is generated;

second comparator means, responsive to a given second limit level and said checked amount, for comparing a signal level of said checked amount with said second limit level, and when said checked amount is found to have reached or exceeded said second limit level, generating a second condition control signal; and sensor means, coupled to said brush-less motor, for detecting a rotor position thereof, to provide a position signal;

selector means, located between said PLL means and said β control means and coupled to said second comparator means and said sensor means, for selecting either of said internal control signal and said position signal, such that when no signal is generated by said second comparator means, said internal control signal is supplied to said β control means, and when said second condition control signal is generated, said position signal is supplied to said β control means.

5. A control apparatus according to claim 4, wherein the level of said first limit level is higher than that of said second limit level.

6. A control apparatus according to claim 4, wherein said switch means is connected in series to said selector means, and the series circuit of said switch means and said selector means is located between said PLL means and said β control means.

7. A control apparatus according to claim 1, wherein said PLL means includes:

a phase comparator for comparing the phase of said EMF signal with that of said internal control signal, and generating a phase difference signal representing said checked amount;

a low-pass filter for filtering off said phase difference signal, to provide a filtered signal; and an oscillator circuit for generating said internal control signal, in accordance with a signal level of said filtered signal.

8. A control apparatus according to claim 3, wherein said PLL means includes:

a phase comparator for comparing the phase of said EMF signal with that of said internal control signal, and generating a phase difference signal;

a low-pass filter for filtering off said phase difference signal, to provide a filtered signal representing said checked amount; and an oscillator circuit for generating said internal control signal, in accordance with a signal level of said filtered signal, and wherein said check means includes:

a differentiation circuit for differentiating said filtered signal with respect to time, and providing a differentiated signal; and a comparator, responsive to a given limit level and said differentiated signal, for comparing a signal level of said differentiated signal with said limit level, and when said differentiated signal is found to have reached or exceeded said limit level, generating said condition control signal.

9. A control apparatus according to claim 3, wherein said PLL means includes:

a phase comparator for comparing the phase of said EMF signal with that of said internal control signal, and generating a phase difference signal;

a low-pass filter for filtering off said phase difference signal, to provide a filtered signal; and a voltage-controlled oscillator for generating a voltage-controlled signal representing said checked amount, in accordance with a signal level of said filtered signal; and a signal generator for generating said internal control signal having a sine waveform, in accordance with said voltage-controlled signal, and wherein said check means includes:

a counter for counting a number of repetition of said voltage-controlled signal for a fixed period of time, and providing a count value; and a comparator for comparing said count value with a given limit number, and when said count value is found to match or exceed said limit number, generating said condition control signal.

10. A method for controlling a brush-less motor, comprising:

energizing the brush-less motor by means of an inverter;

controlling an operation of said inverter by means of a β controller, in accordance with an internal control signal;

detecting a counterelectromotive force generated by said motor, and providing an EMF signal representing said counterelectromotive force;

comparing a phase of said EMF signal with that of said internal control signal, and controlling said β controller in accordance with said internal control signal such that a phase difference between said internal control signal and said EMF signal becomes minimal; and checking an amount of the phase difference between said internal control signal and said EMF signal, and when a checked amount of the phase difference is found to have reached or exceeded a predetermined limit level, modifying the operation of said β controller so that a commutation failure of said inverter is prevented.

11. A method according to claim 10, wherein said checking step includes:

comparing a signal level of said checked amount with said limit level, and when said checked amount is found to have reached or exceeded said limit level, generating a condition control signal; and interrupting a supply of said internal control signal to said β controller when said condition control signal is generated.

12. A method according to claim 11, wherein said checking step further includes:

comparing a signal level of said checked amount with a second limit level, and when said checked amount is found to have reached or exceeded said second limit level, generating a second condition control signal;

detecting a rotor position of said motor, to provide a position signal;

selecting either of said internal control signal and said position signal, such that when said second condition control signal is generated, said position signal is supplied to said β controller, and when said condition control signal is not generated, said internal control signal is supplied to said $\beta$ controller.

13. A method according to claim 12, wherein said $\beta$ controller is controlled such that when said second condition control signal is generated, an advanced control angle of said inverter is increased by a predetermined amount.

14. A method according to claim 12, wherein said $\beta$ controller is controlled such that when said second condition control signal is generated, a rotation speed of said motor is decreased by a prefixed amount from a current operating speed thereof.

15. A method according to claim 10, wherein said checking step includes:
comparing a signal level of said checked amount with said limit level, and when said checked amount is found to have reached or exceeded said limit level, generating a condition control signal;
detecting a rotor position of said motor, to provide a position signal;
selecting either of said internal control signal and said position signal, such that when said condition control signal is generated, said position signal is supplied to said $\beta$ controller, and when said condition control signal is not generated, said internal control signal is supplied to said $\beta$ controller.

* * * * *